(12) United States Patent
McMillan

(10) Patent No.: US 8,578,404 B2
(45) Date of Patent: Nov. 5, 2013

(54) PROGRAM TELECAST MONITORING USING WATERMARKS

(75) Inventor: Francis Gavin McMillan, Tarpon Springs, FL (US)

(73) Assignee: The Nielsen Company (US), LLC, Schaumburg, IL (US)

(*) Notice: Subject to any disclaimer, the term of this patent is extended or adjusted under 35 U.S.C. 154(b) by 168 days.

(21) Appl. No.: 13/173,732

(22) Filed: Jun. 30, 2011

(65) Prior Publication Data

US 2013/0007790 A1 Jan. 3, 2013

(51) Int. Cl.
*H04H 60/32* (2008.01)

(52) U.S. Cl.
USPC ...... 725/19; 725/9; 725/14; 725/20; 713/168; 713/176; 713/600

(58) Field of Classification Search
USPC ............ 725/9, 14, 19–20; 713/168, 176, 600; 382/100
See application file for complete search history.

(56) References Cited

U.S. PATENT DOCUMENTS

| | | | |
|---|---|---|---|
| 6,289,514 B1 | 9/2001 | Link et al. | |
| 7,266,704 B2 | 9/2007 | Levy | |
| 7,616,776 B2 | 11/2009 | Petrovic et al. | |
| 2002/0120925 A1 | 8/2002 | Logan | |
| 2005/0097334 A1* | 5/2005 | Kirovski et al. | 713/176 |
| 2005/0193205 A1 | 9/2005 | Jacobs et al. | |
| 2006/0062426 A1 | 3/2006 | Levy et al. | |
| 2007/0050832 A1 | 3/2007 | Wright et al. | |
| 2007/0294173 A1 | 12/2007 | Levy et al. | |
| 2008/0133416 A1* | 6/2008 | Rhoads | 705/51 |
| 2008/0140433 A1 | 6/2008 | Levy et al. | |
| 2008/0249961 A1 | 10/2008 | Harkness et al. | |
| 2009/0031160 A1 | 1/2009 | Furukawa et al. | |
| 2010/0111355 A1 | 5/2010 | Petrovic et al. | |
| 2010/0246955 A1* | 9/2010 | Wright et al. | 382/173 |
| 2011/0066437 A1 | 3/2011 | Luff | |

OTHER PUBLICATIONS

Cook et al., "Metering Television in the Digital Age" (4 pages).

* cited by examiner

*Primary Examiner* — Mulugeta Mengesha
(74) *Attorney, Agent, or Firm* — Hanley, Flight & Zimmerman, LLC

(57) ABSTRACT

Methods, apparatus and articles of manufacture for program telecast monitoring using watermarks are disclosed. An example method for program monitoring disclosed herein comprises obtaining a sequence of watermarks detected from a presentation of media content at a monitored site, and comparing a data pattern obtained from the sequence of watermarks with a set of possible data patterns to identify a particular program transmission of the media content, the set of possible data patterns being associated respectively with a set of possible transmissions of the media content. An example method to watermark media content disclosed herein comprises encoding the media content with a sequence of watermarks, a watermark in the sequence of watermarks including content identifying payload data, and modifying the sequence of watermarks to also include a data pattern associated with a particular transmission of the media content.

17 Claims, 11 Drawing Sheets

| SID | TIC | Random Pattern | Clock |
|---|---|---|---|
| 212 | 21 | 0 | 1/1/2010 8:00:00 |
| 212 | 22 | 2 | 1/1/2010 8:00:02 |
| 212 | 23 | 1 | 1/1/2010 8:00:04 |
| 212 | 24 | 2 | 1/1/2010 8:00:06 |
| 212 | 25 | 0 | 1/1/2010 8:00:08 |

FIG. 7

| SID | TIC | Random Pattern | Clock |
|---|---|---|---|
| 212 | 21 | 0 | 1/1/2010 11:00:00 |
| 212 | 22 | 2 | 1/1/2010 11:00:02 |
| 212 | 23 | 3 | 1/1/2010 11:00:04 |
| 212 | 24 | 1 | 1/1/2010 11:00:06 |
| 212 | 25 | 2 | 1/1/2010 11:00:08 |

FIG. 8

PROGRAM TELECAST MONITORING USING WATERMARKS

FIELD OF THE DISCLOSURE

This disclosure relates generally to program monitoring and, more particularly, to program telecast monitoring using watermarks.

BACKGROUND

Monitoring the distribution of media content, such as by monitoring television broadcasts, radio broadcasts, streamed multimedia content, etc., to identify media content being provided to viewers, listeners, users, etc., can provide valuable information to advertisers, content providers, and the like. In some scenarios, content distributors may distribute the same media content in different program telecasts occurring at different times (e.g., such as during different program telecasts occurring on different days and/or at different times of the day). Additionally, consumers of media content may observe (e.g., view and/or listen to) media content that was originally distributed linearly (e.g., at particular times for observing at those times) using time-shifting devices and/or services, which can result in nonlinear relationships between content distribution times and content observation times. In such scenarios, being able to identify the particular program telecast in which identified media content was distributed can provide further monitoring granularity and, thus, have further value to advertisers, content providers, and the like.

BRIEF DESCRIPTION OF THE DRAWINGS

FIGS. 7-8 illustrate example contents of two different sets of example disclosed watermarks detected in two different program telecasts of the same media content, along with associated time information determined for the set of detected watermarks.

DETAILED DESCRIPTION

Figure 1:
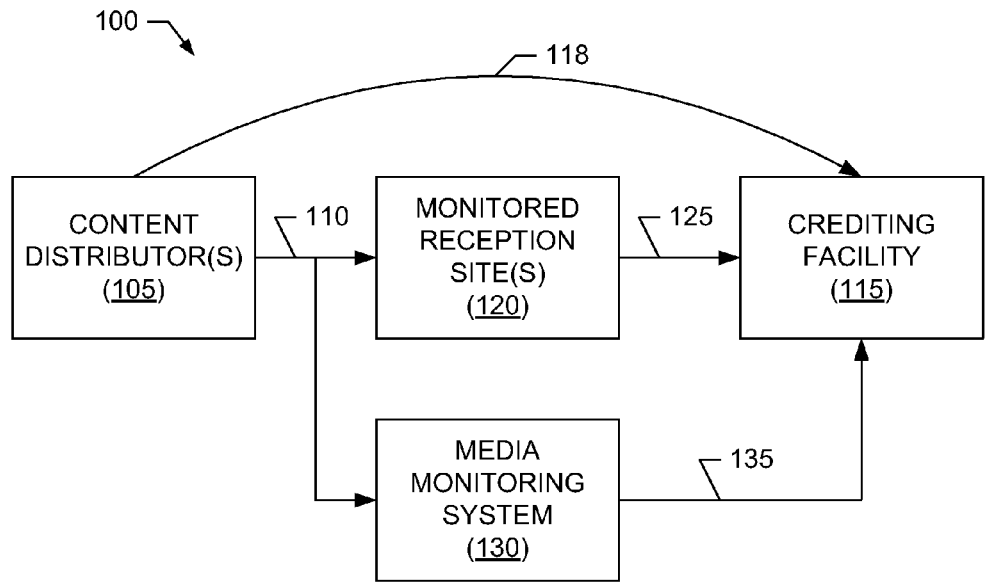
FIG. 1 is block diagram of an example system that uses watermarks to perform program telecast monitoring as disclosed herein.

Methods, apparatus and articles of manufacture for program telecast monitoring using watermarks are disclosed herein. An example disclosed method for program telecast monitoring includes obtaining a sequence of watermarks detected from a presentation of media content at a monitored site. The example method also includes comparing a data pattern obtained from the sequence of watermarks with a set of possible data patterns to identify a particular program telecast of the media content. In the example method, the set of possible data patterns is associated respectively with a set of possible telecasts of the media content.

For example, a watermark in the sequence of watermarks can include content identifying payload data, such as a source identifier and a number within a range of numbers uniquely associated with the media content and the source identifier, and also a portion of the data pattern. In some examples, the data pattern is formed by decoding a respective portion of the data pattern from each watermark of a group of watermarks in the sequence of watermarks, and then combining the respective portions of the data pattern decoded from each watermark of the group of watermarks to form the data pattern. In some examples, a length of the data pattern may be increased after an initial comparison of the data pattern with the set of possible data patterns fails to identify the particular telecast of the media content.

In some examples, the set of possible data patterns that are associated respectively with the set of possible telecasts of the media content are obtained from a system monitoring the set of possible telecasts at a location different from the monitored site. In such examples, respective telecast time information for the set of possible data patterns is also obtained from this system, and the set of possible data patterns are mapped to the respective set of possible telecasts using the respective telecast time information.

In some examples, the method identifies the media content presented at the monitored site using content identifying data included in the obtained sequence of watermarks. In some examples, the method further selects the set of possible data patterns from multiple sets of possible data patterns associated respectively with a multiple different pieces of media content. For example, the method can select from the multiple sets of possible data patterns the particular set associated with the different possible program telecasts of the identified media content.

An example disclosed method to watermark media content to support program telecast monitoring includes encoding the media content with a sequence of watermarks. In some examples, a watermark in the sequence of watermarks includes content identifying payload data. Additionally, the example method includes modifying the sequence of watermarks to also include a data pattern associated with a particular telecast of the media content.

As noted above, in some examples a watermark in the sequence of watermarks includes a portion of the data pattern.

For example, the data pattern can include a sequence of bits, and the portion of the data pattern included in the watermark can include a subset of the sequence of bits. As also noted above, in some examples the content identifying payload data includes a source identifier and a number within a range of numbers uniquely associated with the media content and the source identifier.

In some examples, modifying the sequence of watermarks involves, after the sequence of watermarks have been encoded in the media content, replacing a respective portion of each watermark in the sequence of watermarks encoded in the media content with a different portion of the data pattern. Additionally or alternatively, in some examples modifying the sequence of watermarks involves, after the sequence of watermarks have been encoded in the media content, adding a different portion of the data pattern to each watermark in the sequence of watermarks encoded in the media content.

A program telecast refers to a particular transmission of media content (e.g., via broadcast distribution, streaming, etc.) at a particular time or during a particular time interval. In some examples, a program telecast may be limited to a particular group of recipients, a particular geographic region, etc. Different program telecasts can convey the same or different media content. For example, a particular television program or movie may be rebroadcast multiples times by a content distributor (e.g., a television station, a cable network, a satellite network, etc.) on different days and/or at different times-of-day during the same day. Some prior techniques for monitoring program telecasts employ watermarks (e.g., such as audio watermarks) embedded in the distributed media content to identify a source (e.g., content distributor and/or content provider) of the media content and a day and time-of-day during which the media content was distributed for presentation to recipients (e.g., such as television viewers, radio listeners, computer users, etc.). Other examples of identification information that can be contained in a watermark embedded in the distributed media content include, but are not limited to, a broadcast/network channel number, a program identifier (e.g., program name), a program episode number, etc. Generally, a watermark is embedded or otherwise encoded/included in the distributed media content in a manner that causes the watermark to be unobservable to a person observing the media content presentation.

Some prior techniques for monitoring program telecasts additionally or alternatively employ signatures determined from monitored media content presentations to perform media content monitoring. Generally, a signature is a proxy (e.g., a digital value or series of digital values, a waveform, etc.) for the media content that is determined based on one or more characteristics (e.g., inherent characteristics) of the presented media content, in contrast to a watermark that is embedded or otherwise encoded/included in the distributed media content. In such signature-based techniques, the signatures determined for a monitored media content presentation are compared to a set of reference signatures corresponding to a known set of reference media content programs. When a match is found, the presented media content is identified as corresponding to the reference media content associated with the matching reference signature(s).

In at least some prior systems employing watermarks, the watermarks can be received and decoded by appropriate monitoring equipment to identify the source of a monitored presentation of the media content and the day and time-of-day during which the monitored media content was distributed. This source and time information determined from the detected and decoded watermarks is then compared to separate program schedule information (e.g., such as a television or radio broadcast schedule published by the content distributor) to identify the media content and the particular program telecast in which the media content was distributed.

Such prior techniques for program telecast monitoring are limited in that they are subject to the accuracy of the schedule information, which may be provided by a third-party different from the content distributor. Inaccuracies in the schedule information, which may be caused when the content distributor changes the content included in program telecast(s) after the schedule information has been published, can result in incorrect identification of monitored media content and/or the incorrect identification of the program telecast in which the monitored media content was distributed. In contrast, program telecast monitoring examples disclosed herein can overcome these limitations by removing the reliance on schedule information to identify monitored media content and its associated program telecast. Instead, the examples disclosed herein employ a watermark technique that identifies (e.g., uniquely) the distributed media content, and which includes a watermark data pattern embedded in the distributed media content that can be used to identify a particular telecast via which the media content was distributed.

Turning to the figures, a block diagram of an example system 100 that uses watermarks to perform program telecast monitoring in accordance with the examples disclosed herein is illustrated in FIG. 1. The example system 100 includes one or more example content distributor(s) 105 to distribute media content via one or more program telecasts. A content distributor 105 can correspond to any type of content distributor, such as a television station, a cable network, a satellite network (e.g., television or radio), a radio station, a streaming media service (e.g., such as Hulu™, Netflix®, etc.), etc. As such, the media content distributed by the content distributor(s) 105 can correspond to any type of media content, such as television programming, radio programming, multimedia (e.g., audio and/or visual) content, etc. In the illustrated example, the content distributor(s) 105 can distribute a particular piece of media content (e.g., such as a particular television program, a particular radio program, a particular movie, etc.) to recipients (e.g., television viewers, radio listeners, computer users, electronic device users, etc.) via one or more program telecasts conveyed via one or more example distribution media 110 (e.g., such a one or more radio frequency, cable and/or satellite television and/or radio channels, one or more networks carrying one or more digital transport channels, etc.).

Figure 2:
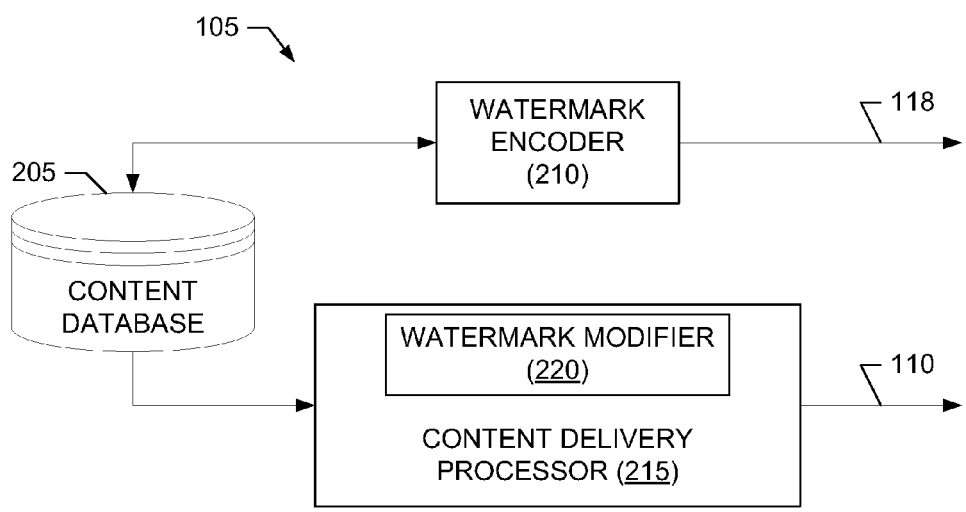
FIG. 2 is a block diagram of an example content distributor that may be included in the example system of FIG. 1.

Additionally, the content distributor(s) 105 encode media content being distributed in a particular program telecast with a sequence of watermarks containing content identifying payload data. The content identifying payload data is also provided to an example crediting facility 115 via an example backchannel connection 118 to facilitate media content identification. The backchannel connection 118 can be any type of data transmission medium, such as one or more data networks (e.g., such as the Internet), one or more mobile telephone (e.g., cellular) networks, a dial-up connection, etc. In the illustrated example, the content distributor(s) 105 also include a data pattern, such as a random data pattern, in the sequence of encoded watermarks to facilitate program telecast monitoring. An example implementation of a content provider 105 is illustrated in FIG. 2, which is described in greater detail below.

Figure 3:
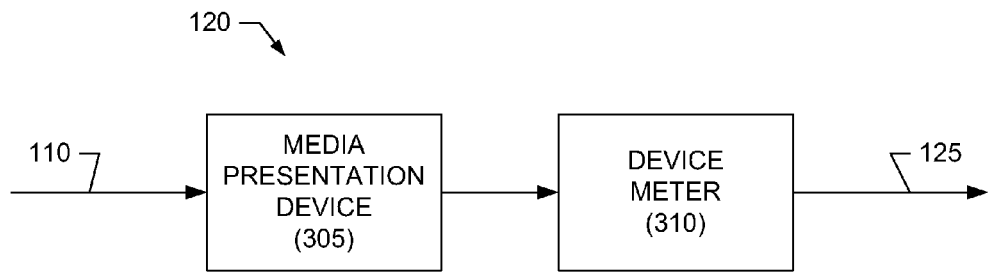
FIG. 3 is a block diagram of an example monitored site that may be included in the example system of FIG. 1.

In the example system 100, the content distributor(s) 105 distribute media content via the distribution media 110 to one or more example monitored reception sites 120. Each monitored reception site 120 includes one or more media presentation devices to present the media content received at the monitored site during a program telecast. Each monitored reception site 120 also includes one or more media content monitors to monitor the media content presented by these media presentation device(s). For example, a media content monitor at a particular monitored reception site 120 can detect watermarks that were encoded in the presented media content by the content distributor 105 distributing the content. The media content monitor can then decode and store the data conveyed by the detected watermarks (along with any other monitored data to be stored), and further report the monitored data to an example crediting facility 115 via an example reporting medium 125. In the illustrated example, the reporting medium 125 can be any type of data transmission medium, such as one or more data networks (e.g., such as the Internet), one or more mobile telephone (e.g., cellular) networks, a dial-up connection, etc. An example implementation of a monitored reception site 120 is illustrated in FIG. 3, which is described in greater detail below.

Figure 4:
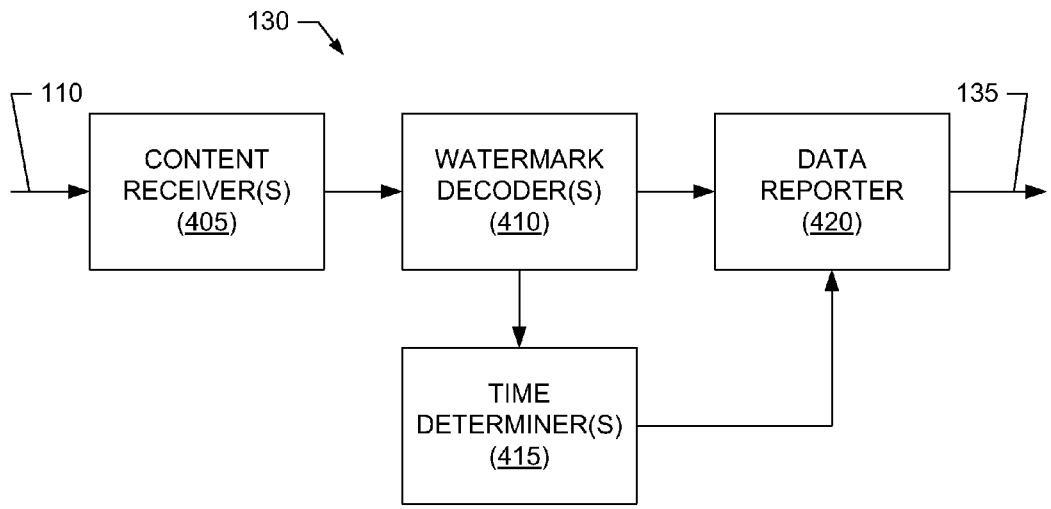
FIG. 4 is a block diagram of an example media monitoring system that may be included in the example system of FIG. 1.

The example system 100 also includes an example media monitoring system (MMS) 130 to monitor ongoing program telecasts by some or all of the content distributor(s) 105. As described in greater detail below, in some examples, the MMS 130 is located separately from the monitored reception site(s) 120 and determines reference watermark data for possible program telecasts that could be received by the monitored reception site(s) 120. For example, for each program telecast monitored by the MMS 130, the MMS 130 detects and decodes the watermarks that were encoded by the respective content distributor 105 providing the content to determine a data pattern uniquely associated with that content distributor 105 and the particular telecast being monitored. The MMS 130 also determines time information (e.g., such as day and/or time-of-day information) corresponding to when the monitored program telecast. The MMS 130 then stores and reports this reference watermark data and timing information to the crediting facility 115 via an example reporting medium 135. This reference watermark data is then compared with site watermark data determined at a monitored reception site 120 to facilitate program telecast monitoring. In the illustrated example, the reporting medium 135 can be any type of data transmission medium, such as one or more data networks (e.g., such as the Internet), one or more mobile telephone (e.g., cellular) networks, a dial-up connection, etc. Additionally, the backchannel connection 118, the reporting medium 125 and/or the reporting medium 135 can be the same or different media. An example implementation of the MMS 130 is illustrated in FIG. 4, which is described in greater detail below.

Figure 5:
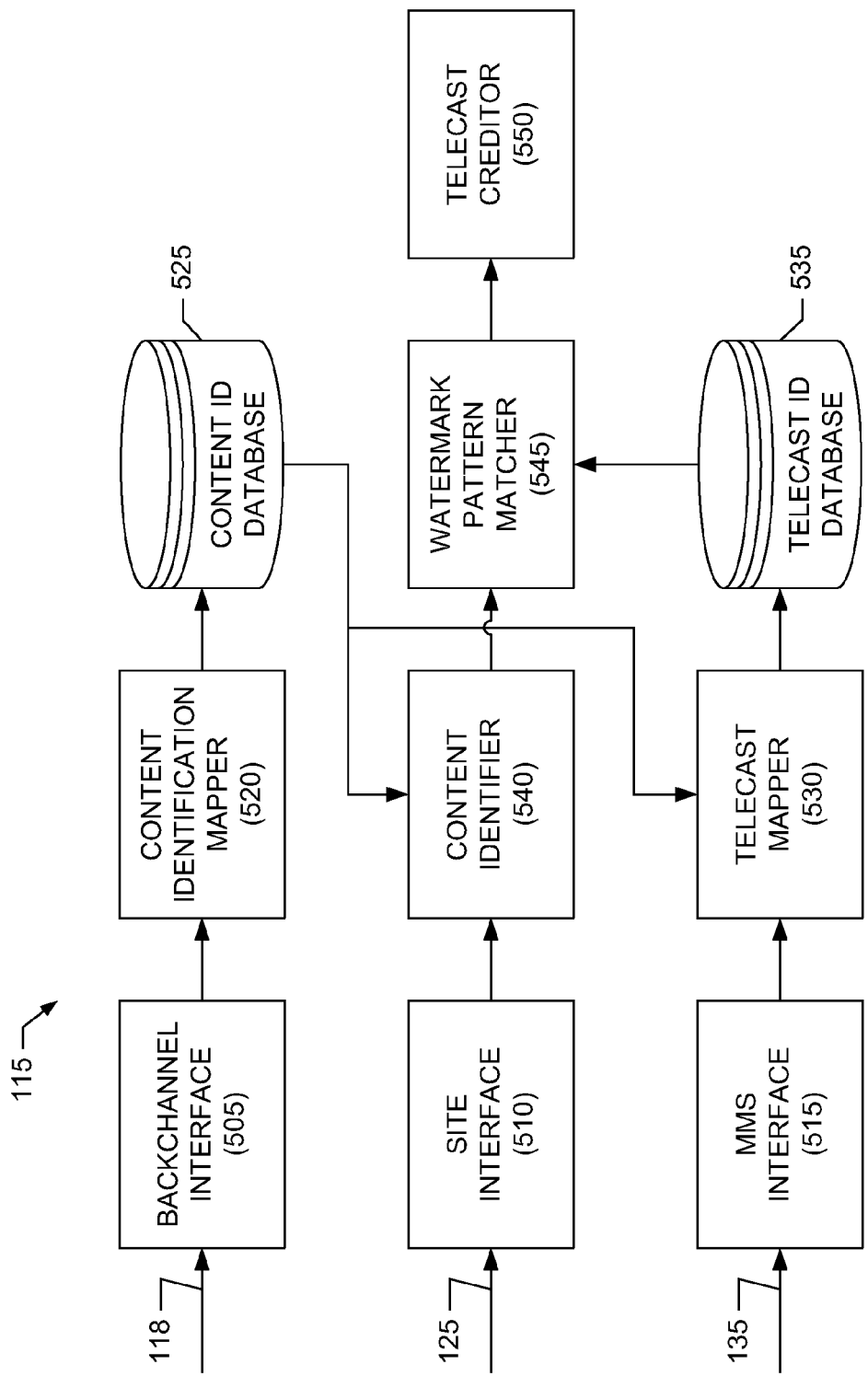
FIG. 5 is a block diagram of an example crediting facility that may be included in the example system of FIG. 1.

In the example system 100, the crediting facility 115 receives content identifying payload data from the content distributor(s) 105 via the backchannel connection 118, site watermark data (and any other monitored data) from the monitored sites(s) 105 via the reporting medium 125, and reference watermark data and timing information from the MMS 130 via the reporting medium 135. In the illustrated example, the crediting facility 115 uses the reference watermark data and timing information obtained from the MMS 130 to determine a set of possible data patterns corresponding respectively to a set of possible telecasts for each piece of media content that could be received by the monitored reception site(s) 120. In the illustrated example, the crediting facility 115 also processes the site watermark data using the content identifying payload data obtained from the content distributor(s) 105 via by the backchannel 118 to identify the particular media content presented at a particular monitored site 120, and to also select the particular set of possible data patterns corresponding to the set of possible telecasts of this identified media content. In the illustrated example, the crediting facility 115 further compares a data pattern determined from the site watermark data reported by the particular monitored site 120 with the selected set of possible data patterns associated with possible program telecasts of the identified media content to determine the particular program telecast via which the identified media content was distributed to the monitored site 120. An example implementation of the crediting facility 115 is illustrated in FIG. 5, which is described in greater detail below A block diagram of an example implementation of one of the content distributors 105 of FIG. 1 is illustrated in FIG. 2. The example content distributor 105 of FIG. 2 includes an example content database 205 to store media content to be distributed by the content distributor 105. The content database 205 can be implemented by any type or combination of one or more memories and/or storage devices. For example, the content database 205 can be implemented by the mass storage device 1430 and/or the volatile memory 1418 in the example processing system 1400 of FIG. 14, which is described in greater detail below.

The example content distributor 105 of FIG. 2 also includes an example watermark encoder 210 to retrieve media content stored in the content database 205 and encode (e.g., embed) a sequence of watermarks into the media content. For example, the sequence of watermarks encoded by the watermark encoder 210 in the media content can be a sequence of audio watermarks encoded in audio portion(s) of the media content a regular intervals of time (e.g., such as every 2 seconds or any other constant or changing interval of time) using any appropriate audio watermarking technique. Additionally or alternatively, the sequence of watermarks encoded in the media content by the watermark encoder 210 can be a sequence of video watermarks encoded in video portion(s) of the media content a regular intervals of time (e.g., such as every 2 seconds or any other constant or changing interval of time) using any appropriate video watermarking technique. In some examples, the watermarks can include or otherwise convey content identifying payload data that identifies, for example, a source of the media content (e.g., such as the particular content distributor 105) and/or the media content itself (e.g., such as a title of the media content, an episode number, etc.).

An example of content identifying payload data that can be included in a watermark encoded by the watermark encoder 210 is illustrated in Table 1.

TABLE 1

| Field | Definition |
|---|---|
| Source Identifier | Identifier tied to a watermark encoder 210 assigned to a watermarking entity, such as the content distributor 105 (note, more than one watermark encoder 210 can be assigned to a watermarking entity) |
| Type Code | Set to a program content (PC) type code if the watermarking entity is an originator of the media content; otherwise set to a final distributor type code if the watermarking entity is a final distributor of the media content |
| Time-In-Content Value | A numeric value that is incremented by the watermark encoder 210 in each successive watermark |

In the example of Table 1, the source identifier is a serial number or other identification number identifying the watermark encoder 210 and, by extension, the content distributor 105 of FIG. 2. The time-in-content (TIC) field includes a numeric value that incremented in each successive watermark embedded by the watermark encoder 210. In some examples, when a particular piece of media content is being watermarked, the watermark encoder 210 stores the starting TIC value and the ending TIC value for the sequence of watermarks encoded in the particular media content. In some examples, a unique range of TIC values (e.g., specified by starting and ending TIC values) can be associated with each piece of media content encoded by the watermark encoder 210 and, thus, each piece of media content distributed by the content distributor 105. For example, if the TIC values are 64-bit numbers that are incremented in each successive watermark encoded by the watermark encoder 210, and watermarks are embedded in media content at 2 second intervals, then the complete range of possible TIC values covers more than 1 trillion years worth of media content.

In the illustrated example, the watermark encoder 210 stores the watermark encoded content back in the content database 205 (or another storage) for later retrieval when the media content is to be distributed via a particular program telecast. Additionally, the watermark encoder 210 reports the content identifying payload data (e.g., the source identifier and range of TIC values) to the crediting facility 115 via the backchannel connection 118. In some examples, the content distributor 105 also reports other content identifying information (e.g., such as the name of the content distributor 105, a title of the media content, an episode number, etc.) that is to be mapped to the content identifying payload data to enable proper crediting of media content presented and monitored at the monitored receptions site(s) 120. As described in greater detail below, the crediting facility 115 can compare the content identifying payload data reported by the watermark encoder 210 with watermark payload data decoded from detected watermarks to identify monitored media content presented in the monitored reception site(s) 120.

Figure 6:
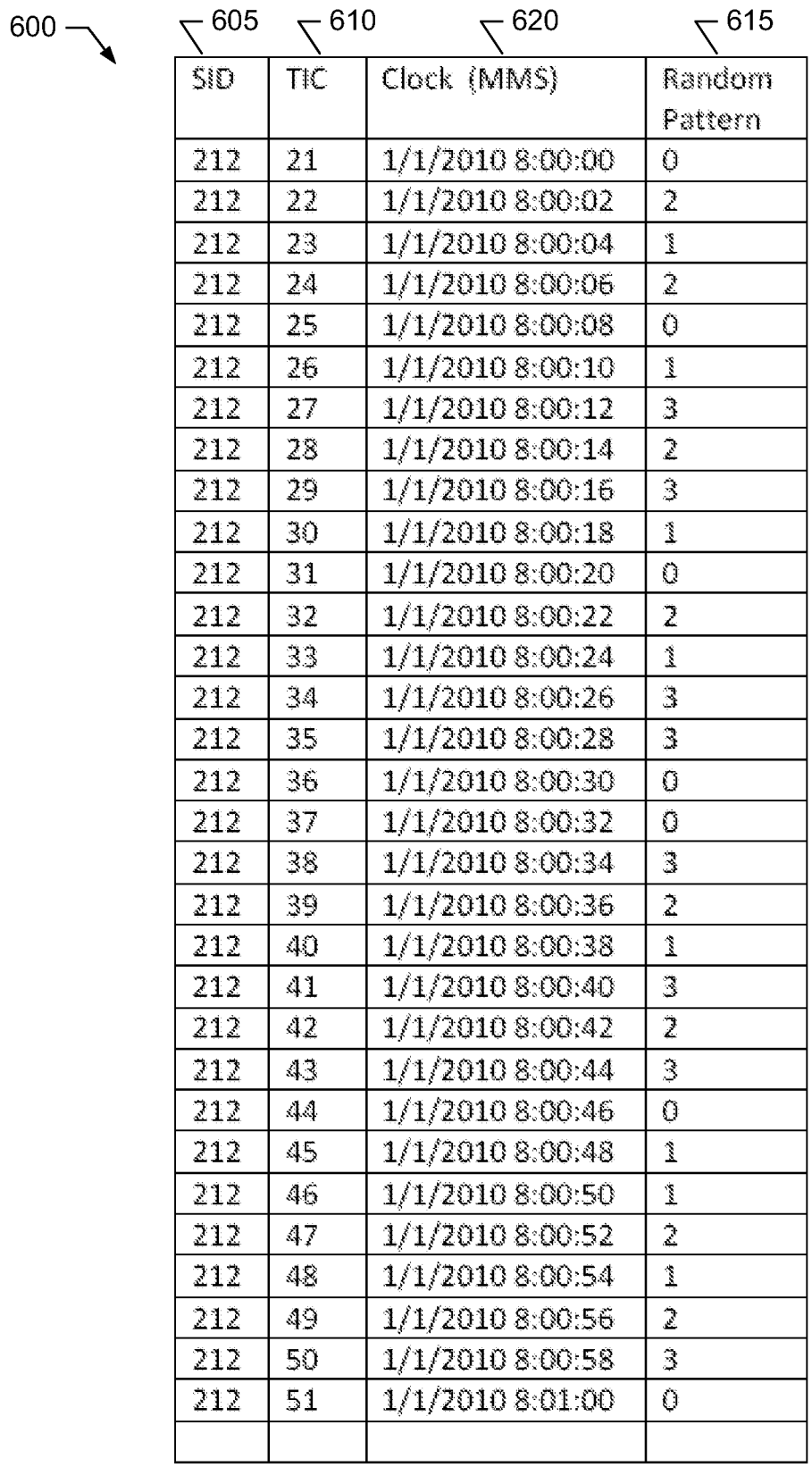
FIG. 6 illustrates example contents of a set of example disclosed watermarks detected in media content distributed via a program telecast by the example content distributor of FIG. 2, along with associated time information determined for the set of detected watermarks.

To distribute particular media content in a particular program telecast, the content distributor 105 of FIG. 2 also includes an example content delivery processor 215 to retrieve from the content database 205 the media content to be distributed via the distribution medium 110. In the illustrated example, the content delivery processor 215 performs any appropriate processing to prepare the media content retrieved from the content database for distribution in a particular program telecast. Additionally, the content delivery processor 215 includes an example watermark modifier 220 to modify the sequence of watermarks encoded by the watermark encoder 210 in the retrieved media content to enable program telecast monitoring in accordance with the examples described herein. For example, the watermark modifier 220 modifies the sequence of watermarks to include a data pattern that can be used to determine the particular program telecast used to distribute the particular media content retrieved from the content database. In such an example, each watermark in the sequence of watermarks is modified by the watermark modifier 220 to include a portion of the data pattern. For example, if the data pattern corresponds to a random bit pattern, the watermark modifier 220 can repurpose 1 or more bits (e.g., such as 2 bits) in each watermark of the sequence of encoded watermarks to carry a corresponding 1 or more bits (e.g., such as 2 bits) of the random data pattern. Additionally or alternatively, in some examples the watermark modifier 220 can add 1 or more bits (e.g., such as 2 bits) to each watermark of the sequence of encoded watermarks to carry a corresponding 1 or more bits (e.g., such as 2 bits) of the random data pattern. In such examples, the portion of the data pattern included in each watermark is not a timestamp or other time information, and can be smaller (e.g., significantly smaller) than any timestamp or other time information that is included in watermarks employed by other prior systems. An example data pattern included in an example sequence of watermarks encoded in media content distributed by the content provider 105 in a particular program telecast is illustrated in FIG. 6, which is described in greater detail below.

In the illustrated example of FIG. 2, the content distributor 105 is able to watermark media content once (e.g., upon receipt) and then store the watermarked content for later distribution. Although not shown in FIG. 2, in some examples, the watermark encoder 210 can also receive other (e.g., live) media content to be watermark encoded during distribution (e.g., in real-time). In such examples, the watermark encoder 210 can also implement the functionality of the watermark modifier 220 to include the random data pattern in the sequence of watermarks encoded in the media content being distributed by the content distributor 105.

A block diagram of an example implementation of one of the monitored reception sites 120 of FIG. 1 is illustrated in FIG. 3. The example monitored reception site 120 of FIG. 3 includes an example media presentation device 305 to present media content received in program telecast via the distribution medium 110. The media presentation device 305 can correspond to any type of media presentation device, such as a set-top box, a television, a radio, a personal computer, tablet computer, a portable digital assistant, a smartphone, etc.

The example monitored reception site 120 of FIG. 3 also includes an example device meter 310 to monitor media content presented by the media presentation device 305. In the illustrated example, the device meter 310 detects watermarks encoded (e.g., embedded) in a media content presentation of the media presentation device 305. For example, the device meter 310 can include an audio interface (e.g., a digital audio interface and/or a audio line interface) to receive an audio signal, and/or a microphone or other audio sensor to sense the audio signal output/emitted by the media presentation device 305 during a media content presentation. In such an example, the device meter 310 includes an audio watermark decoder to detect audio watermarks encoded in the received/sensed audio signal corresponding to the audio portion of the presented media content. Additionally or alternatively, the device meter 310 can include a video interface (e.g., a digital video interface and/or a video line interface) to receive a video signal, and/or a camera or other video sensor to sensed the video signal output/emitted by the media presentation device 305 during a media content presentation. In such an example, the device meter 310 includes a video watermark decoder to detect video (e.g., image) watermarks encoded in the received/sensed video signal corresponding to the video portion of the presented media content.

The device meter 310 of the illustrated example decodes the detected watermarks at the monitored reception site 120 and stores the decoded site watermark data (as well as any other metering information captured by the device meter 310) for reporting to the crediting facility 115 via the reporting medium 125. The decoded site watermark data includes the content identifying payload data (e.g., such as the source identifier and TIC values of Table 1) included in the watermarks by the watermark encoder 210 of the particular content distributor 105 that distributed the monitored media content, as well as the data pattern for program telecast identification included in the watermarks by the watermark modifier 220. The device meter 310 can report the decoded site watermark data (as well as any other metering information captured by the device meter 310) as it is collected (e.g., streamed), at specified/predetermined time intervals, when a certain amount of data has been collected, when an available memory space is filled or reaches a threshold capacity (e.g., 90% or some other percentage being full), etc.

A block diagram of an example implementation of the MMS 130 of FIG. 1 is illustrated in FIG. 4. As discussed above, the MMS 130 may be located separately from the monitored site(s) 105 and monitors one, some or all of the different media content being distributed by the content distributor(s) 105 via the distribution media 110. In the illustrated example of FIG. 4, the MMS 130 includes one or more content receivers 405 to receive media content being distributed by the content distributor(s) 105 via the distribution media 110. For example, the content receiver(s) 405 can include multiple content receivers assigned to respective content distributors 105, such as particular television channels/networks, particular radio channels/networks, particular streaming services, etc. Additionally or alternatively, one or more of the content receiver(s) 405 can be shared (e.g., time-multiplexed) among multiple content distributors 105.

The example MMS 130 of FIG. 4 also includes one or more watermark decoders 410 to detect and decode watermarks included (e.g., embedded) by the content distributor(s) 105 in the distributed media content received by the content receiver(s) 405. For example, the watermark decoder(s) 410 can include audio watermark decoder(s) to detect audio watermarks encoded in audio signal(s) corresponding to audio portion(s) of the media content received by the content receiver(s) 405. Additionally or alternatively, watermark decoder(s) 410 can include video watermark decoder(s) to detect video (e.g., image) watermarks encoded in the video signal(s) corresponding to video portion(s) of the media content received by the content receiver(s) 405. As such, in some examples, the watermark decoder(s) 410 may be similar to the watermark decoder(s) 410 used to detect and decode site watermarks at the monitored sites(s) 120.

The watermark data decoded by the watermark decoder(s) 410 forms reference watermark data that can be used (e.g., by the crediting facility 115) to identify different media content being distributed by the content distributor(s) 105. For example, for each media content distribution received and processed by the MMS 130, the decoded reference watermark data output from the watermark decoder(s) 410 includes the content identifying payload data (e.g., such as the source identifier and TIC values of Table 1) encoded in the watermarks by the watermark encoder 210 of the particular content distributor 105 that distributed the processed media content, as well as the data pattern for program telecast identification included in the watermarks by the watermark modifier 220.

The example MMS 130 of FIG. 4 further includes one or more time determiner(s) 415 to determine time information for association with the reference watermark data determined by the watermark decoder(s) 410. For example, a watermark decoder 410 can trigger a time determiner 415 to determine time information indicating when reference watermark data for a particular piece of media content was detected and decoded and, thus, when this particular media content was received by the respective content receiver 405. The time information can include, for example, the particular day and/or time-of-day at which the particular reference watermark data was detected and decoded, which corresponds to the particular day and/or time-of-day at which the media content corresponding to this reference watermark data was received by the MMS 130. In some examples, each watermark decoder 410 is associated with a respective time determiner 415. In some examples, groups of watermark decoders 410 are associated with a respective time determiner 415. The time determiner(s) 415 can include any timing source, such as a clock, timer, etc., capable of providing time information having a predetermined or specified accuracy. As described in greater detail below, the time information determined by the time determiner(s) 415 can be used to associate the watermark data and, in particular, the random data patterns included in the watermark data, with particular program telecasts being used by the content distributor(s) 105 to distribute media content in the system 100.

Example reference watermark data and associated time information 600 determined for a sequence of watermarks detected and decoded from media content received by the MMS 130 in a particular program telecast is illustrated in FIG. 6. The reference watermark data includes the content identifying payload data contained in each watermark of the detected and decoded sequence of watermarks. In the illustrated example, this content identifying payload data includes an example source identifier 605 having a value of 212 that uniquely identifies the particular watermark encoder 210 that encoded the watermarks (and, thus, identifies the particular content distributor 205 associated with this particular watermark encoder 210). The content identifying payload data obtained from each watermark also includes an example TIC value 610 that is incremented in each successive watermark and that lies within a range (e.g., 21 through 51 in the illustrated examples) that, when combined with the source identifier 605, is uniquely associated with the particular media content from which the watermark payload data was obtained.

In the example of FIG. 6, the content identifying payload data further includes example random pattern data 615 that was inserted by the watermark modifier 220 that processed the media content during or prior to distribution in a particular program telecast. In the illustrated example, the random pattern data 615 was determined by the watermark modifier 220 using any random or pseudorandom technique, thereby making the random pattern data 615 unique to the particular program telecast used to distribute the media content (or at least partially unique and common among only a small set of telecasts).

The time information in the illustrated example of FIG. 6 includes timestamp data 620 indicating the day and time-of-day corresponding to when each signature was detected and decoded from the received media content. In the example of FIG. 6, the watermarks in the sequence of watermarks occur at 2 second intervals. The timestamp data 620 identifies a particular program telecast by identifying the time (e.g., the day and time-of-day) of the particular program telecast. As described in greater detail below, the time of a particular program telecast can be mapped to the random pattern data 615 to enable the random pattern data 615 to be used to identify the particular program telecast.

Two examples 700 and 800 of reference watermark data and associated time information determined by the MMS 130 from two different program telecasts of the same media content distributed by the same content distributor 105 are illustrated in FIGS. 7 and 8, respectively. Because the media content and content distributor 105 are the same for both program telecasts, the source identifiers 705 and 805 are the same in both examples, and the TIC values 710 and 810 in the two examples lie in the same range (e.g., 21 through 51) that is associated with this media content. However, because the examples correspond to two different program telecasts, the random pattern data 715 and 815, and the time information 720 and 820, are different in the two examples. For example, the time information 720 indicates that the example 700 of FIG. 7 corresponds to a program telecast occurring at 8:00 AM on Jan. 1, 2010, whereas the time information 820 indicates that the example 800 of FIG. 8 corresponds to a different program telecast occurring at 11:00 AM on Jan. 1, 2010, but that contains the same media content as the program telecast that occurred earlier at 8:00 AM. Because the random pattern data 715 and 815 are different, detection of the random pattern 715 in a sequence of watermarks can be used to determine that the media content identified by the source identifier 705 and TIC range 710 was distributed in the program telecast occurring at 8:00 AM, whereas detection of the random pattern 815 in a sequence of watermarks can be used to determine that the media content identified by the source identifier 805 and TIC range 810 was distributed in the program telecast occurring at 11:00 AM.

A block diagram of an example implementation of the crediting facility 115 of FIG. 1 is illustrated in FIG. 5. The example crediting facility 115 of FIG. 5 includes an example backchannel interface 505 to obtain content identifying payload data from the content distributor(s) 105. As described above, the content identifying payload data reported by the content distributor(s) 105 to the crediting facility 115 is also encoded (e.g., embedded) as watermarks in media content to be distributed by the content distributor(s) 105. The example crediting facility 115 of FIG. 5 also includes an example site interface 510 to obtain site watermark data reported from the monitored reception site(s) 120. As described above, the site watermark data reported by the monitored reception site(s) 120 includes content identifying payload data and data pattern(s) decoded from watermarks detected at the monitored reception site(s) 120. The example crediting facility 115 of FIG. 5 further includes an example MMS interface 515 to obtain reference watermark data and time information reported by the MMS 130. As described above, the reference watermark data includes content identifying payload data decoded from watermarks detected in the different program telecasts of media content monitored at the MMS 130. The reference watermark data also includes the random data patterns decoded from the sequences of watermarks detected in the different media content provided by the different program telecasts monitored by the MMS 130. The time information reported by the MMS 130 indicates when the watermark data was determined and, thus, also indicates which program telecasts provided the different media content corresponding to the different watermark data In the illustrated example, one or more of the backchannel interface 505, the site interface 510 and/or the MMS interface 515 can be implemented by any type of data interface, such as the interface circuit 1424 in the example processing system 1400 of FIG. 14, which is described in greater detail below.

An example content identification mapper 520 is included in the example crediting facility 115 of FIG. 5 to map the content identifying payload data (e.g., source identifiers and ranges of TIC values) received via the backchannel interface 505 to other content identifying information (e.g., such as distributor name, media content title, episode number, etc.) also provided by the content distributor(s) 105 (e.g., which may be provided as metadata via the backchannel connection 118). The content identification mapper 520 stores this mapped data in an example content identification database 525. The crediting facility 115 can use the mapped data stored in the content identification database 525 to map payload data determined from reported site watermark data (e.g., such as a decoded source identifier and a range of decoded TIC values) to other content identification information (distributor name, media content title, episode number, etc.) to properly identify and credit the media content presented and monitored at a particular monitored reception site 120. The content identification database 525 can be implemented by the mass storage device 1430 and/or the volatile memory 1418 in the example processing system 1400 of FIG. 14, which is described in greater detail below.

An example telecast mapper 530 is included in the example crediting facility 115 of FIG. 5 to map the different data patterns included in the reference watermark data reported by the MMS 130 to one or more possible program telecasts of the different media content whose identification information was reported to the crediting facility 115 via the backchannel interface 118. In some examples, the telecast mapper 530 maps a set of data patterns obtained from the MMS 130 via the MMS interface 515 to a respective set of program telecasts using the telecast time information also obtained via the MMS interface 515 and associated with each data pattern and, thus, with each program telecast. To perform this mapping, the telecast mapper 530 can, for example, receive a particular data pattern included in the reference watermark data obtained from the MMS 130 via the MMS interface 515 for a particular program telecast of media content. The telecast mapper 530 can then use the content identifying payload data (e.g., such as a source identifier and range of TIC values) included in the reference watermark data to query the content identification database 525 to identify the media content associated with the received data pattern. The telecast mapper 530 can further use the telecast time information (e.g., day and/or time-of-day) obtained from the MMS 130 via the MMS interface 515 and associated with the received data pattern being processed to associate the received data pattern with a distribution of the identified media content during a particular telecast identified by the telecast time information.

As an illustrative example, assume that the reference watermark data reported by the MMS 130 includes the source identifier 705, the TIC values 710 and the random pattern 715, and that the telecast time information includes the time information 720 of the example 700 of FIG. 7. In such an example, the telecast mapper 530 can use the source identifier 705 having a value of 212 and the range of TIC values 710 from {21-25} to query the content identification database 525 to identify the particular media content corresponding to the reported reference watermark data. The telecast mapper 530 can then map this identified media content to the random pattern {0, 2, 1, 2, 0} and further associate this random pattern with a program telecast of the media content occurring at 8:00 AM on Jan. 1, 2010, based on the telecast time information 720.

Because media content can be distributed in multiple different program telecasts, the set of data patterns and associated program telecasts identified by the telecast mapper 530 as being associated with a particular piece of media content form the set of possible data patterns and respective set of possible program telecasts for that particular media content. The telecast mapper 530 stores the set of possible data patterns and respective set of possible program telecasts (e.g., identified by date, time-of-day, duration, etc.) for each piece of media content represented in the reported reference watermark data in an example telecast identification database 535. The telecast identification database 535 can be implemented by the mass storage device 1430 and/or the volatile memory 1418 in the example processing system 1400 of FIG. 14, which is described in greater detail below.

To identify and properly credit the particular program telecasts of media content presented in the monitored reception site(s) 120, the example crediting facility 115 of FIG. 5 further includes an example content identifier 540, an example watermark pattern matcher 545 and an example telecast creditor 550. In the illustrated example, the content identifier 540 obtains site watermark data reported by a monitored reception site 520 for a sequence of detected watermarks and identifies media content presented at the monitored reception site 520 using the content identifying payload data included in the reported site watermark data. For example, the content identifier 540 can use the content identifying information (e.g., source identifier, range of TIC values, etc.) included in one or more watermarks in the sequence of watermarks corresponding to the reported site watermark data to query the content identification database 525 to identify the particular media content that was presented at the particular monitored reception site 520.

In the illustrated example, after the content identifier 540 identifies the particular media content corresponding to the reported site watermark data for the sequence of watermarks detected at the particular monitored reception site 120, the watermark pattern matcher 545 selects from the telecast identification database 535 a set of possible data patterns associated respectively with a set of possible telecasts that have been identified by the telecast mapper 530 as being associated with the media content identified by the content identifier 540. The watermark pattern matcher 545 then compares a site data pattern obtained from site watermark data reported for the sequence of watermarks detected at the particular monitored site 120 with the set of possible data patterns selected and retrieved from the telecast identification database 535 to identify a particular program telecast of the media content identified by the content identifier 540 as having been presented at the particular monitored reception site 120.

In some examples, to determine the site data pattern for comparison with the set of possible data patterns to perform program telecast identification, the watermark pattern matcher 545 can obtain respective portions (e.g., 1 of more bits) of the data pattern from each of a group of watermarks whose data is included in the reported site watermark data. The watermark pattern matcher 545 can then combine these respective portions of the data pattern obtained from each watermark to form the site data pattern. To improve computational/processing efficiencies, in some examples it may be unnecessary to determine and compare an entire site data pattern with the possible data patterns associated with the respective possible program telecasts of the identified media content. For example, the watermark pattern matcher 545 may determine the site data pattern for some portion (e.g., such as the initial 60 seconds, or some other amount of time) of the reported site watermark data for the identified media content. The watermark pattern matcher 545 then compares this smaller portion of the site data pattern to the possible data patterns obtained from the telecast identification database 535 for the identified media content (e.g., using a sliding comparison window applied over the possible data patters). If an unambiguous match is determined, the watermark pattern matcher 545 assigns the identified media content to the program telecast (e.g., the telecast broadcast time) associated with matching possible data pattern. However, if an unambiguous match is not determined (e.g., if more than one possible data pattern matches the determined site data pattern), the watermark pattern matcher 545 can increase the size of the portion of the site data pattern (e.g., to include the first 120 seconds, or some other amount of time larger than the initial amount of time) and then retry comparing of this larger site data pattern to the possible data patterns obtained from the telecast identification database 535 for the identified media content. This procedure can be repeated until an unambiguous match is obtained.

In some examples, to history of program telecast data stored in the telecast identification database 535 is limited to a specified/predetermined duration of time (e.g., such as 7 days). By limiting the history of program telecast data stored in the telecast identification database 535, and because each site data pattern is compared with just those possible data patterns known to be associated with the identified media content, the possibility of achieving an unambiguous match between the site data pattern and one of the possible data patterns can be high even for short site data patterns (e.g., such as data patterns corresponding to as little as the first 30 seconds of the program telecast, which corresponds to a site data pattern having 15 values when watermarks are embedded at 2 second intervals).

In some examples, one or more matching tolerance values are specified/predetermined for the watermark pattern matcher 545. For examples, watermark decode errors can cause slight discrepancies between the site data pattern determined from the site watermark data reported by a particular monitored reception site 120, and the reference watermark data reported by the MMS 130. To account for the possibility of such differences, one or more tolerance values (e.g., such as a value 95%) can be used to indicate the percentage/portion of the site data pattern that needs to be the same as a possible data pattern for the watermark pattern matcher 545 to determine that the two data patterns are a match. In some examples, the tolerance value can vary depending on the length of the site data pattern, the number of comparison iterations performed with site patterns having different lengths, etc.

The telecast creditor 550 of the illustrated example uses the matching results provided by the watermark pattern matcher 545 to credit or otherwise indicate which particular program telecast of which particular media content was presented at a particular monitored reception site 550. Additionally, in some examples, the telecast creditor 550 identifies which one or more portions of the particular media were presented at the particular monitored reception site 550. For example, if the watermark payload data contains TIC values that are incremented in each successive watermark (e.g., such as at 2 second intervals), then the telecast creditor 550 can use the start time of the identified program telecast along with a comparison of the TIC values included in the reported site watermark data for a particular media content presentation with the TIC values in the reference watermark data corresponding to the matching possible data pattern to determine which portion(s) (e.g., in time) of the particular media content were presented at the monitored reception site 550. In some examples, the telecast creditor 550 stores the crediting results and can generate reports in any appropriate format for providing to, for example, one or more of the content distributor(s) 105, and/or advertisers, content providers, etc., and the like.

While example manners of implementing the content distributor(s) 105, the monitored reception site(s) 120, the MMS 130 and the crediting facility 115 of FIG. 1 have been illustrated in FIGS. 2-5, one or more of the elements, processes and/or devices illustrated in FIGS. 2-5 may be combined, divided, re-arranged, omitted, eliminated and/or implemented in any other way. Further, the example content database 205, the example watermark encoder 210, the example content delivery processor 215, the example watermark modifier 220, the example media presentation device 305, the example device meter 310, the example content receiver(s) 405, the example watermark decoder(s) 410, the example time determiner(s) 415, the example data reporter 420, the example backchannel interface 505, the example site interface 510, the example MMS interface 515, the example content identification mapper 520, the example content identification database 525, the example telecast mapper 530, the example telecast identification database 535, the example content identifier 540, the example watermark pattern matcher 545, the example telecast creditor 550 and/or, more generally, the example content distributor(s) 105, the example monitored reception site(s) 120, the example MMS 130 and/or the example crediting facility 115 of FIGS. 2-5 may be implemented by hardware, software, firmware and/or any combination of hardware, software, firmware and/or firmware. Thus, for example, any of the example content database 205, the example watermark encoder 210, the example content delivery processor 215, the example watermark modifier 220, the example media presentation device 305, the example device meter 310, the example content receiver(s) 405, the example watermark decoder(s) 410, the example time determiner(s) 415, the example data reporter 420, the example backchannel interface 505, the example site interface 510, the example MMS interface 515, the example content identification mapper 520, the example content identification database 525, the example telecast mapper 530, the example telecast identification database 535, the example content identifier 540, the example watermark pattern matcher 545, the example telecast creditor 550 and/or, more generally, the example content distributor(s) 105, the example monitored reception site(s) 120, the example MMS 130 and/or the example crediting facility 115 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example content distributor(s) 105, the example monitored reception site(s) 120, the example MMS 130, the example crediting facility 115, the example content database 205, the example watermark encoder 210, the example content delivery processor 215, the example watermark modifier 220, the example media presentation device 305, the example device meter 310, the example content receiver(s) 405, the example watermark decoder(s) 410, the example time determiner(s) 415, the example data reporter 420, the example backchannel interface 505, the example site interface 510, the example MMS interface 515, the example content identification mapper 520, the example content identification database 525, the example telecast mapper 530, the example telecast identification database 535, the example content identifier 540, the example watermark pattern matcher 545 and/or the example telecast creditor 550 are hereby expressly defined to include a tangible computer readable medium such as a memory, digital versatile disk (DVD), compact disk (CD), etc., storing such software and/or firmware. Further still, the example content distributor(s) 105, the example monitored reception site(s) 120, the example MMS 130 and/or the example crediting facility 115 of FIGS. 2-5 may include one or more elements, processes and/or devices in addition to, or instead of, those illustrated in FIGS. 2-5, and/or may include more than one of any or all of the illustrated elements, processes and devices.

Flowcharts representative of example machine readable instructions that may be executed to implement one or more of the example system 100, the example content distributor(s) 105, the example monitored reception site(s) 120, the example MMS 130, the example crediting facility 115, the example content database 205, the example watermark encoder 210, the example content delivery processor 215, the example watermark modifier 220, the example media presentation device 305, the example device meter 310, the example content receiver(s) 405, the example watermark decoder(s) 410, the example time determiner(s) 415, the example data reporter 420, the example backchannel interface 505, the example site interface 510, the example MMS interface 515, the example content identification mapper 520, the example content identification database 525, the example telecast mapper 530, the example telecast identification database 535, the example content identifier 540, the example watermark pattern matcher 545 and/or the example telecast creditor 550 are shown in FIGS. 9-13. In these examples, the machine readable instructions represented by each flowchart may comprise one or more programs for execution by a processor, such as the processor 1412 shown in the example processing system 1400 discussed below in connection with FIG. 14. Alternatively, the entire program or programs and/or portions thereof implementing one or more of the processes represented by the flowcharts of FIGS. 9-13 could be executed by a device other than the processor 1412 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 9-13 may be implemented manually. Further, although the example machine readable instructions are described with reference to the flowcharts illustrated in FIGS. 9-13, many other techniques for implementing the example methods and apparatus described herein may alternatively be used. For example, with reference to the flowcharts illustrated in FIGS. 9-13, the order of execution of the blocks may be changed, and/or some of the blocks described may be changed, eliminated, combined and/or subdivided into multiple blocks.

As mentioned above, the example processes of FIGS. 9-13 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 9-13 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 9:
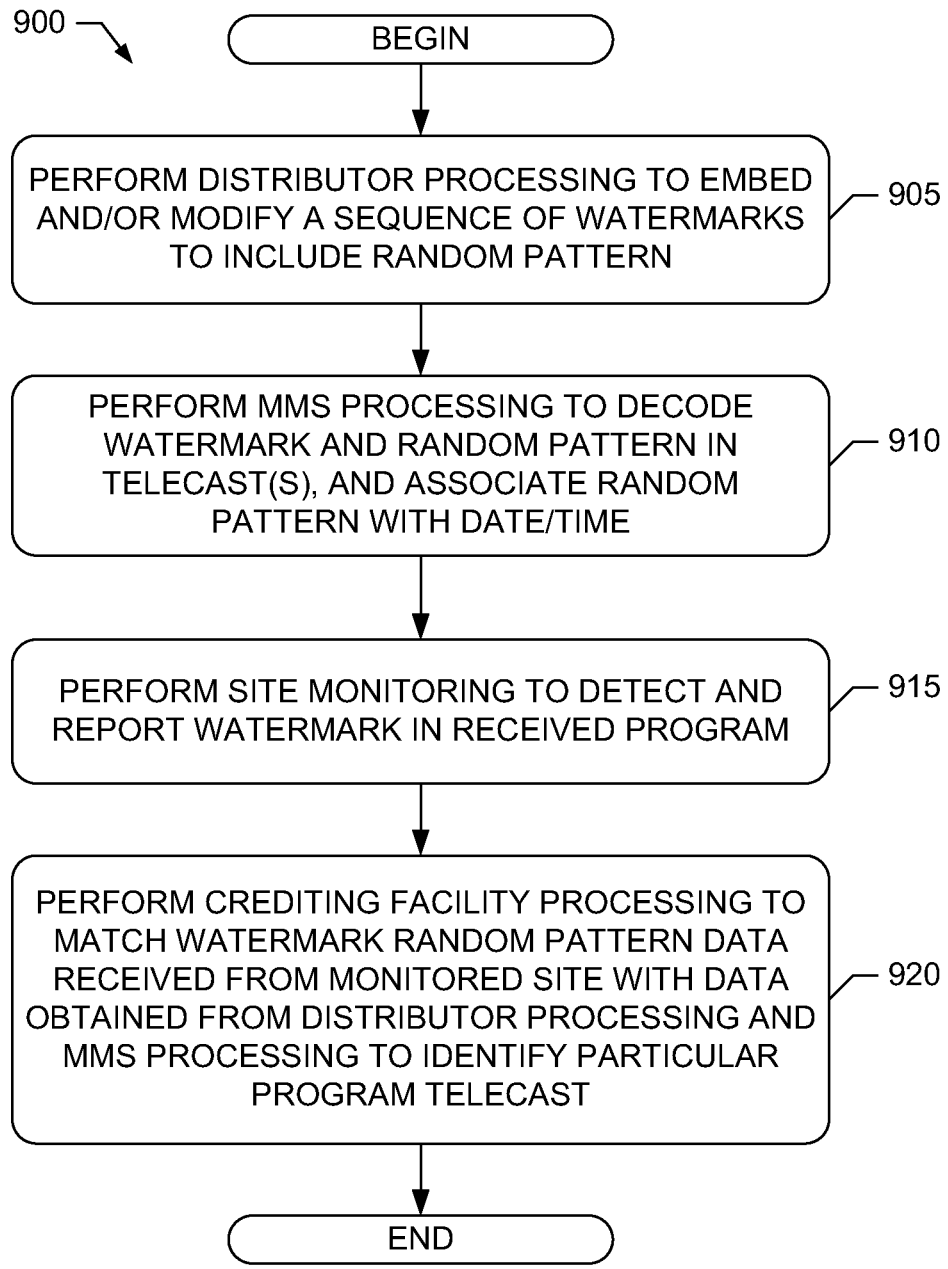
FIG. 9 is a flowchart representative of example machine readable instructions that may be executed to implement the example system of FIG. 1.
Figure 10:
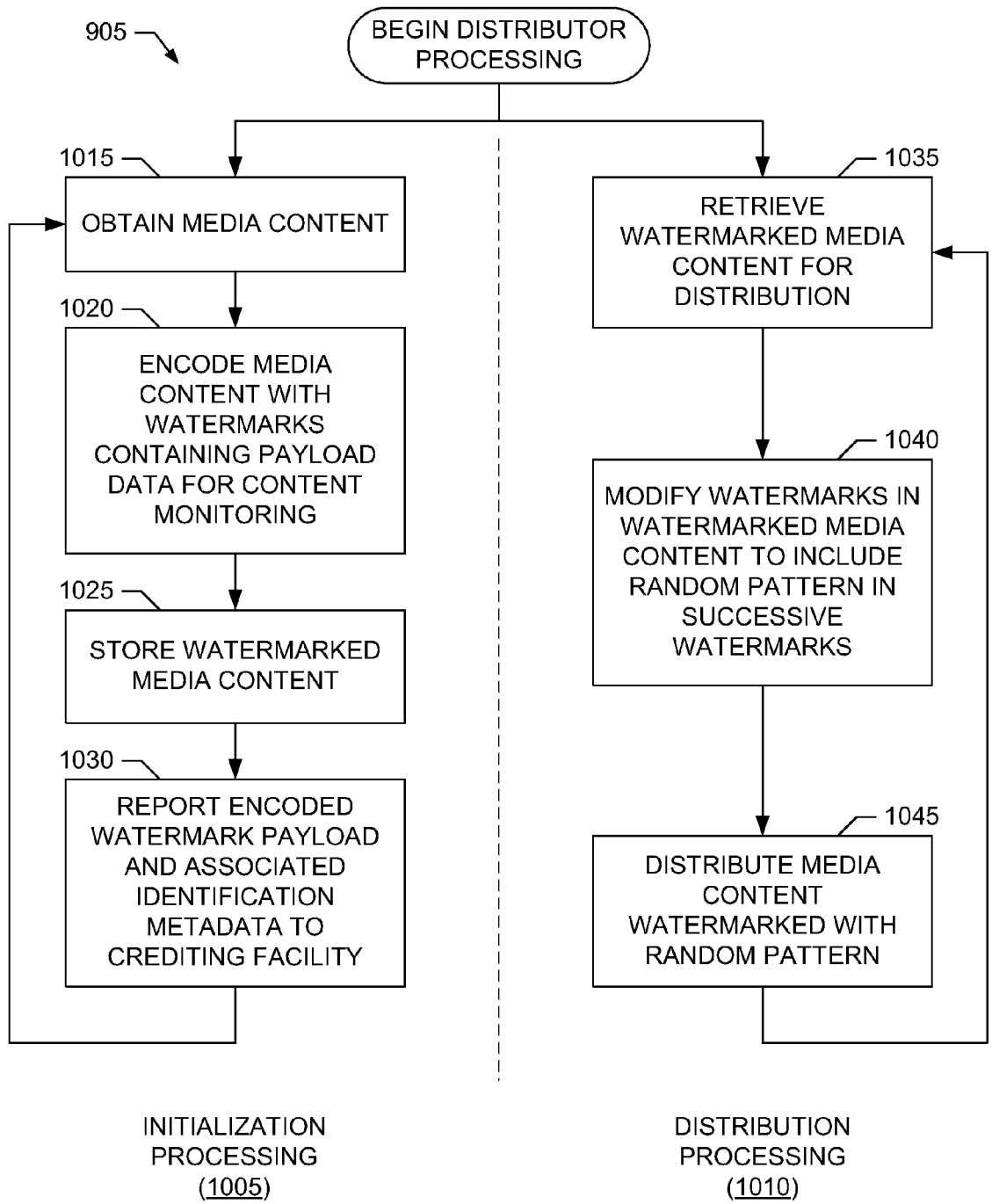
FIG. 10 is a flowchart representative of example machine readable instructions that may be executed to implement watermark encoding in the example content distributor of FIG. 2.

Example machine readable instructions 900 that may be executed to implement the example system 100 of FIG. 1 are illustrated in FIG. 9. With reference to the preceding figures, the machine readable instructions 900 of FIG. 9 begin execution at block 905 at which at least one of the content distributor(s) 105 embeds and/or modifies a sequence of watermarks in distributed media content to include a random data pattern for use in program telecast monitoring, as described above. Example machine readable instructions that may be used to implement the processing at block 905 are illustrated in FIG. 10, which is described in greater detail below.

Figure 11:
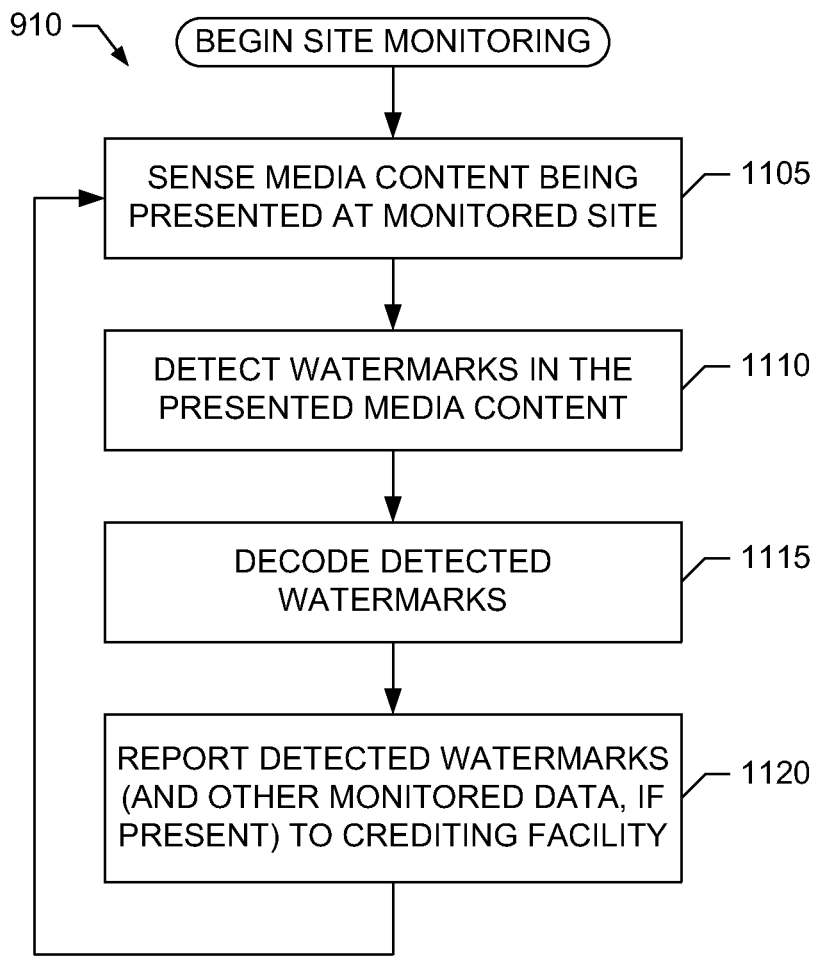
FIG. 11 is a flowchart representative of example machine readable instructions that may be executed to implement content monitoring in the example monitored site of FIG. 3.

At block 910, the MMS 130 detects watermarks from monitored program telecasts. The processing at block 910 includes decoding the random data patterns included in the sequence of watermarks detected from different monitored program telecasts, and associating the random data patterns with respective telecast time information (e.g., day and/or time-of-day information) to identify program telecasts associated respectively with each random data pattern, as described above. Example machine readable instructions that may be used to implement the processing at block 910 are illustrated in FIG. 11, which is described in greater detail below.

Figure 12:
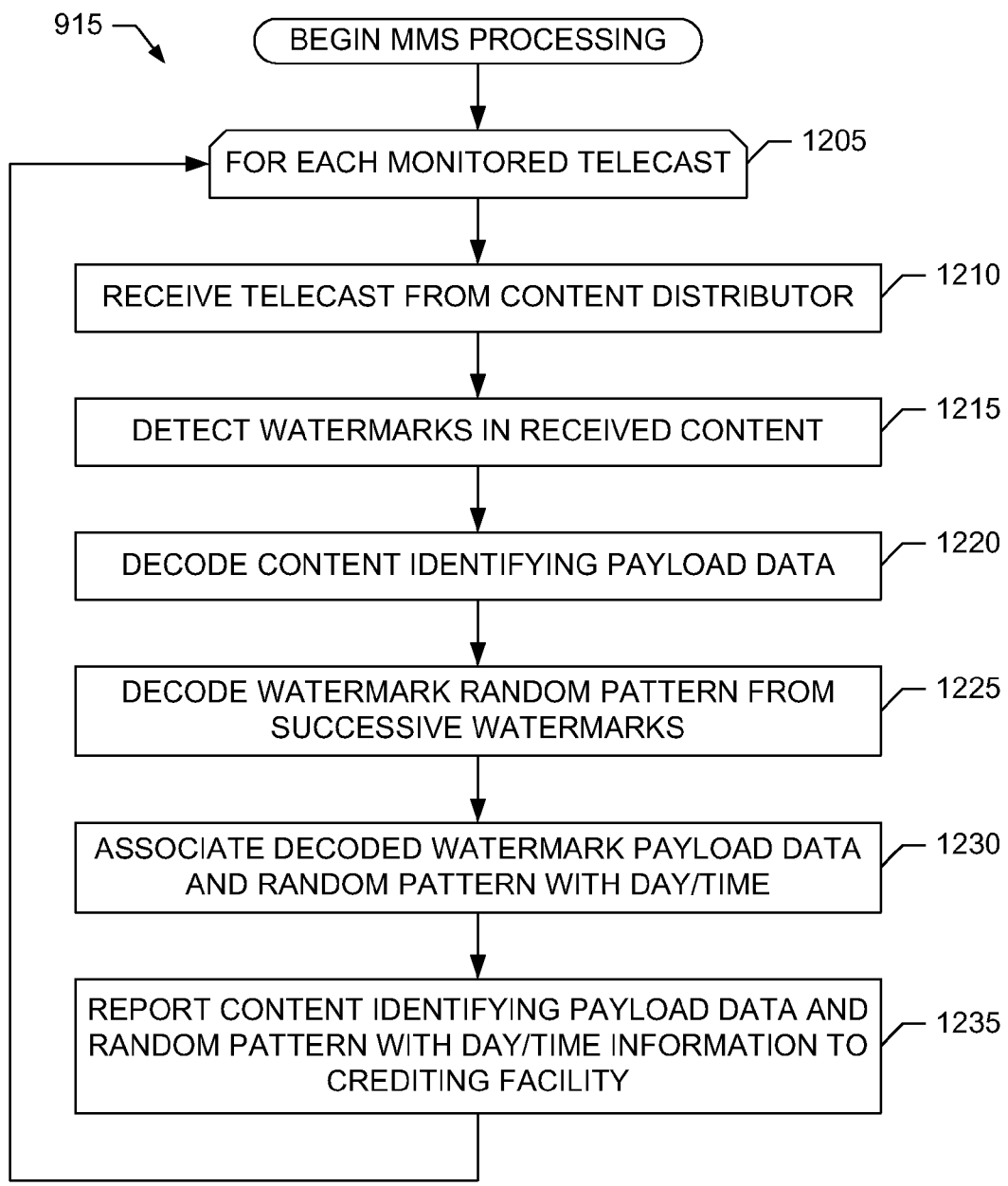
FIG. 12 is a flowchart representative of example machine readable instructions that may be executed to implement the example media monitoring system of FIG. 4.

At block 915, at least one of the device meters 310 in at least one or the monitored reception sites 120 detects and reports site watermark data, including random pattern data, for media content presented at the monitored site 120, as described above. Example machine readable instructions that may be used to implement the processing at block 915 are illustrated in FIG. 12, which is described in greater detail below.

Figure 13:
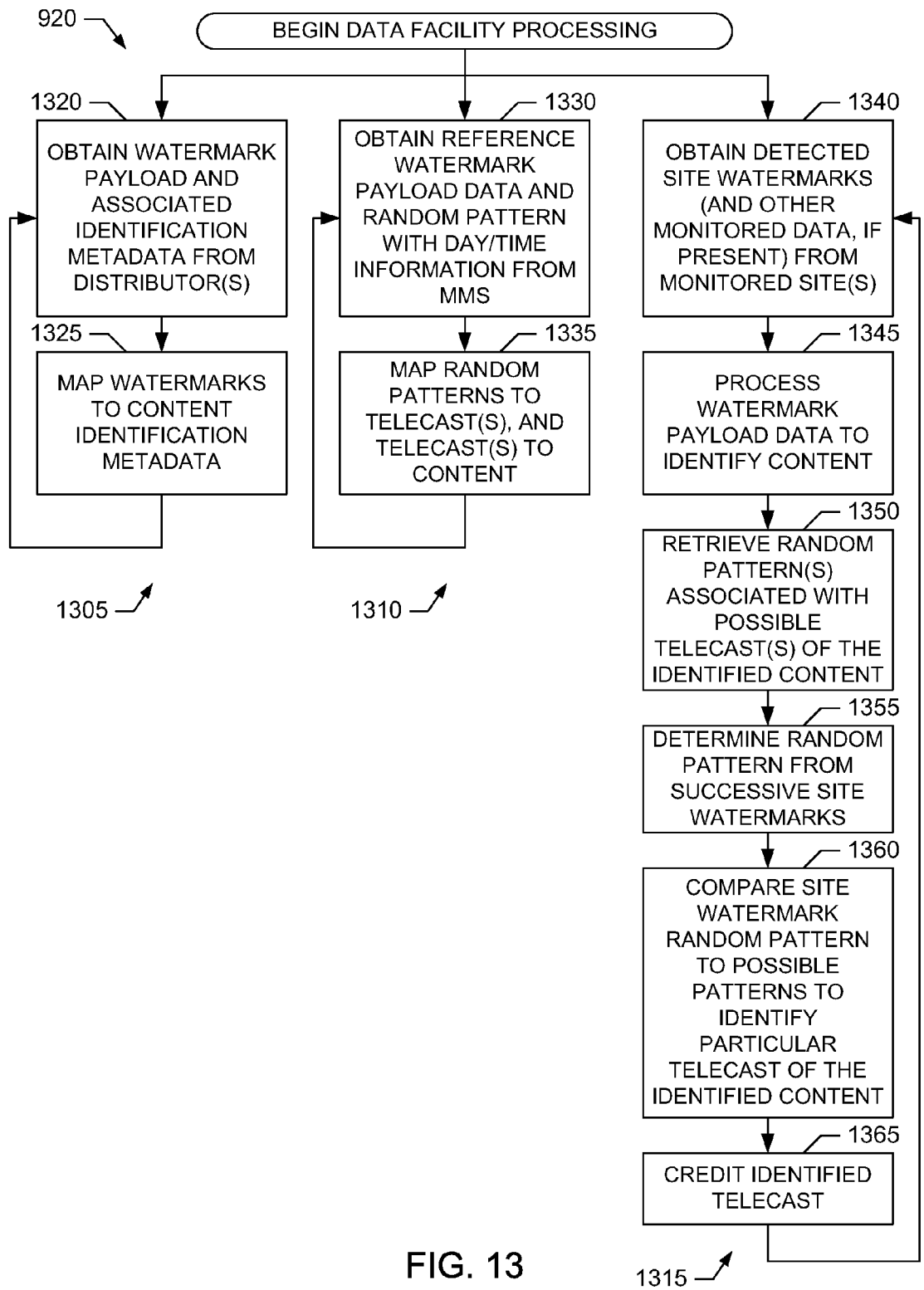
FIG. 13 is a flowchart representative of example machine readable instructions that may be executed to implement the example crediting facility of FIG. 5.

At block 920, the crediting facility 115 matches a site random pattern obtained from the site watermark data reported at block 915 with a set of random data patterns received at block 910 and associated with possible program telecasts of the media content associated with the site watermark data. The processing at block 920 includes identifying the media content associated with reported site watermark data as corresponding to a particular program telecast associated with the possible data pattern that matches the site random pattern. Example machine readable instructions that may be used to implement the processing at block 920 are illustrated in FIG. 13, which is described in greater detail below.

Although FIG. 9 suggests that the processing at block 905-920 is performed in a serial manner, in some examples the processing at one or more of the blocks 905-920 can be performed in parallel with the processing at other(s) of the blocks 905-920. Additionally, the processing illustrated in FIG. 9 can be repeated to enable continues monitoring of program telecasts in accordance with the examples disclosed herein.

Example machine readable instructions 905 that may be executed to implement an example content distributor 105 of FIG. 1, and/or the processing at block 905 of FIG. 9, are illustrated in FIG. 10. The machine readable instructions 905 implement two example processing threads 1005 and 1010 that can be executed serially, or some or all of the processing threads 1005 and 1010 can be executed in parallel. The processing thread 1005 implements initialization processing, whereas the processing thread 1010 implements distribution processing. With reference to the preceding figures, the initializing processing thread 1005 implemented by the machine readable instructions 905 of FIG. 10 begins execution at block 1015 at which the watermark encoder 210 of the content distributor 105 obtains media content to be watermarked. For example, the watermark encoder 210 can obtain the content when it is first received at the content distributor 105 for later distribution, and/or retrieve the content from the content database 205, and/or receive the content in real-time as it is generated or received at the content distributor 105 for live distribution, etc.

At block 1020, the watermark encoder 210 encodes the media content obtained at block 1015 with a sequence of watermarks containing payload data for content monitoring. For example, the payload data can include content identifying information (e.g., such as data listed in Table 1), as described above. In some examples, at block 1025 the watermark encoder 210 stores the watermarked media content in the content database 205 (e.g., for later retrieval for distribution at an appropriate). At block 1030, the watermark encoder 210 reports the watermark payload data that was encoded in the media content, as well as other associated content identification data (e.g., such as the name of the content distributor 105, a title of the media content, an episode number, etc.), to the crediting facility 115. The thread 1005 then repeats to enable additional media content to be watermarked.

The distribution processing thread 1010 implemented by the machine readable instructions 905 of FIG. 10 begins execution at block 1035 at which the content delivery processor 215 of the content distributor 105 retrieves watermarked media content from the content database 205 for distribution. At block 1040, the watermark modifier 220 of the content distributor 105 modifies portions of the sequence of watermarks encoded in the media content to include a random data pattern in the sequence of watermarks that can be used for program telecast monitoring and identification, as described above. At block 1045, the content delivery processor 215 distributes the watermarked media content (that also includes the watermarked random data pattern) via the appropriate distribution medium 110. The thread 1010 then repeats to enable additional media content to be distributed.

Example machine readable instructions 910 that may be executed to implement an example device meter 310 at an example monitored reception site 120 of FIG. 1, and/or the processing at block 910 of FIG. 9, are illustrated in FIG. 11. With reference to the preceding figures, the machine readable instructions 910 of FIG. 11 begin execution at block 1105 at which the device meter 310 of the monitored reception site 120 senses or otherwise monitors media content being presented by the media presentation device 305 of the monitored reception site 120. For example, the device meter 310 may sense or otherwise receive an audio signal and/or a video signal corresponding to a media content presentation of the media presentation device 305. At block 1110, the device meter 310 detects watermarks (e.g., audio and/or video watermarks) in the presented media content sensed at block 1105. At block 1115, the device meter 310 decodes the detected watermarks to obtain site watermark data including, for example, the content identifying payload data and the random pattern data included in the detected watermarks. At block 1120, the device meter 310 reports the site watermark data obtained at block 1115, as well as any other monitoring data (e.g., such as viewer identification information, presentation device usage information, etc.) obtained by the device meter 310, to the crediting facility 115. Some or all of the machine readable instructions 910 can operate repeatedly to enable monitoring of additional media content presented by the media presentation device 305.

Example machine readable instructions 915 that may be executed to implement the example MMS 130 of FIG. 1, and/or the processing at block 915 of FIG. 9, are illustrated in FIG. 12. With reference to the preceding figures, for each program telecast being monitored at the MMS 130 (represented by block 1205), the machine readable instructions 915 of FIG. 12 begin processing at block 1210 at which the a content receiver 405 of the MMS 130 receives the program telecast from the corresponding content distributor 105. At block 1215, a watermark decoder 410 of the MMS 130 detects watermarks (e.g., audio and/or video watermarks) included in the media content provided by the particular program telecast being monitored at block 1210. At blocks 1220 and 1225, the watermark decoder 410 decodes the watermark data from the detected watermark to obtain reference watermark data for this monitored program telecast. The reference watermark data decoded at block 1220 includes, for example, the content identifying payload data that was encoded by the content distributor 105. The reference watermark data decoded at block 1225 includes, for example, portions of the random data pattern included in each successive watermark by the content distributor 105 to enable program telecast monitoring and identification, as described herein. Additionally, at block 1225 the watermark decoder 410 combines the portions of the random data pattern obtained from the successive detected watermarks to determine the random data pattern corresponding to and, thus, representative of the particular program telecast providing the particular media content received at block 1210.

At block 1230, a time determiner 415 of the MMS 130 determines time information to indicate, for example, the day and/or time-of-day of the program telecast being monitored at block 1210 and, thus, the day and/or time-of-day at which each watermark was detected and decoded at blocks 1215-1225. Additionally, at block 1230 the data reporter 420 of the MMS 130 associates the time information with the random data pattern determined at block 1225 to enable the random data pattern to identify a program telecast occurring at, for example, the day and/or time-of-day specified in the time information. At block 1235, the data reporter 420 reports the reference watermark data, including the content identifying payload data and the random data pattern with associated time information, to the crediting facility 115. Some or all of the machine readable instructions 915 can operate repeatedly to enable monitoring of additional program telecasts by the MMS 130.

Example machine readable instructions 920 that may be executed to implement the example crediting facility 115 of FIG. 1, and/or the processing at block 920 of FIG. 9, are illustrated in FIG. 13. The machine readable instructions 920 implement two example processing threads 1305, 1310 and 1315 that can be executed serially, or some or all of the processing threads 1305, 1310 and 1315 can be executed in parallel. The processing thread 1305 implements reception and processing of the content identifying watermark payload data reported by the content distributor(s) 105. The processing thread 1310 implements reception and processing of the reference watermark data reported by the MMS 130. The processing thread 1315 implements reception and processing of the site watermark data reported by the monitored reception site(s) 120.

With reference to the preceding figures, the processing thread 1305 implemented by the machine readable instructions 920 of FIG. 13 begins execution at block 1320 at which the backchannel interface 505 of the crediting facility 115 obtains from the content distributor(s) 105 the content identifying payload data encoded as watermarks in the media content to be distributed by the content distributor(s) 105. At block 1320, the backchannel interface 505 also obtains any content identifying metadata (e.g., such as the name of a particular content distributor 105, a title of the media content, an episode number, etc.) to be associated with the content identifying watermark payload data. At block 1325, the content identification mapper 520 of the crediting facility 115 maps the content identifying watermark payload data obtained at block 1320 with the content identifying metadata also obtained at block 1320 to enable identification of the media content distributed by the content distributor(s) 105 using the watermarks encoded in the media content, as described above. The processing of the thread 1305 repeats to enable additional content identifying payload data and metadata for other media content to be received from the content distributor(s) 105.

The processing thread 1310 implemented by the machine readable instructions 920 of FIG. 13 begins execution at block 1330 at which the MMS interface 515 of the crediting facility 115 obtains reference watermark data, including content identifying payload data and random pattern data with associated time information, for the program telecasts monitored at the MMS 130. At block 1335, the telecast mapper 530 of the crediting facility 115 uses the content identification mappings determined by the processing thread 1305 to map the random data patterns obtained at block 1330 to different possible program telecasts of different pieces of media content distributed by the content distributor(s) 105. The processing of the thread 1310 repeats to enable additional reference watermark data to be received from the MMS 130.

The processing thread 1315 implemented by the machine readable instructions 920 of FIG. 13 begins execution at block 1340 at which the site interface 510 of the crediting facility 115 obtains the site watermark data, and any other monitoring data, from the monitored site(s) 120. At block 1345, the content identifier 540 of the crediting facility uses the content identification mappings determined by the processing thread 1305 to processes the content identifying payload data obtained at block 1340 to identify particular media content that was monitored as being presented at a particular monitored reception site 120. At block 1350, the watermark pattern matcher 545 of the crediting facility 115 uses the telecast mapping processing performed by the processing thread 1310 to obtain the possible random data patterns associated with the possible program telecasts of the media content identified by the processing at block 1345 as having been presented at the monitored site 120.

At block 1355, the watermark pattern matcher 545 determines a site random data pattern for a portion of the reported site watermark data obtained at block 1340, as described above. At block 1360, the watermark pattern matcher 545 compares, as described above, the site random data pattern determined at block 1355 to the possible data patterns obtained at block 1350 to identify the particular program telecast the provided the media content that was presented at the monitored reception site 120. At block 1365, the telecast creditor 550 of the crediting facility 115 credits the particular program telecast that provided the monitored media content that was presented at the monitored reception site 1365. The processing of the thread 1315 repeats to enable other site watermark data to be received from the same and/or different monitored reception site(s).

Figure 14:
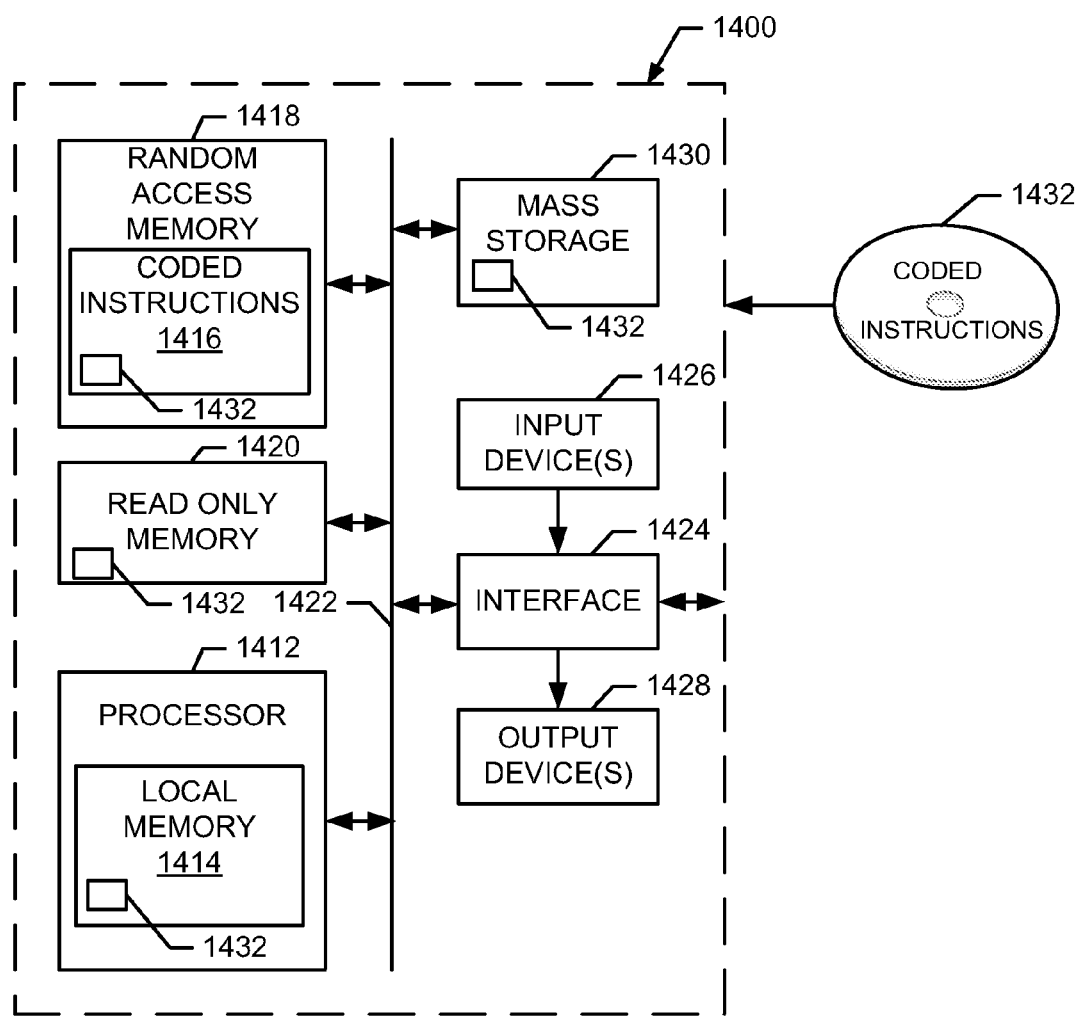
FIG. 14 is a block diagram of an example processing system that may execute the example machine readable instructions of FIGS. 9-12 and/or 13 to implement the example system of FIG. 1, the example content distributor of FIG. 2, the example monitored site of FIG. 3, the example media monitoring system of FIG. 4 and/or the example crediting facility of FIG. 5.

FIG. 14 is a block diagram of an example processing system 1400 capable of implementing the apparatus and methods disclosed herein. The processing system 1400 can be, for example, a server, a personal computer, a personal digital assistant (PDA), an Internet appliance, a DVD player, a CD player, a digital video recorder, a personal video recorder, a set top box, or any other type of computing device.

The system 1400 of the instant example includes a processor 1412 such as a general purpose programmable processor. The processor 1412 includes a local memory 1414, and executes coded instructions 1416 present in the local memory 1414 and/or in another memory device. The processor 1412 may execute, among other things, the machine readable instructions represented in FIGS. 9-13. The processor 1412 may be any type of processing unit, such as one or more Intel® microprocessors from the Pentium® family, the Itanium® family and/or the XScale® family, one or more microcontrollers from the ARM® and/or PICO families of microcontrollers, etc. Of course, other processors from other families are also appropriate.

The processor 1412 is in communication with a main memory including a volatile memory 1418 and a non-volatile memory 1420 via a bus 1422. The volatile memory 1418 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1420 may be implemented by flash memory and/or any other desired type of memory device. Access to the main memory 1418, 1420 is typically controlled by a memory controller (not shown).

The processing system 1400 also includes an interface circuit 1424. The interface circuit 1424 may be implemented by any type of interface standard, such as an Ethernet interface, a universal serial bus (USB), and/or a third generation input/output (3GIO) interface.

One or more input devices 1426 are connected to the interface circuit 1424. The input device(s) 1426 permit a user to enter data and commands into the processor 1412. The input device(s) can be implemented by, for example, a keyboard, a mouse, a touchscreen, a track-pad, a trackball, an isopoint and/or a voice recognition system.

One or more output devices 1428 are also connected to the interface circuit 1424. The output devices 1428 can be implemented, for example, by display devices (e.g., a liquid crystal display, a cathode ray tube display (CRT)), by a printer and/or by speakers. The interface circuit 1424, thus, typically includes a graphics driver card.

The interface circuit 1424 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1400 also includes one or more mass storage devices 1430 for storing machine readable instructions and data. Examples of such mass storage devices 1430 include floppy disk drives, hard drive disks, compact disk drives and digital versatile disk (DVD) drives. In some examples, the mass storage device 1430 may implement the content database 205, the content identification database 525 and/or the telecast identification database 535. Additionally or alternatively, in some examples the volatile memory 1418 may implement the content database 205, the content identification database 525 and/or the telecast identification database 535.

The coded instructions 1432 of FIGS. 9-13 may be stored in the mass storage device 1430, in the volatile memory 1418, in the non-volatile memory 1420, in the local memory 1414 and/or on a removable storage medium, such as a CD or DVD 1432.

As an alternative to implementing the methods and/or apparatus described herein in a system such as the processing system of FIG. 14, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for media monitoring, the method comprising:
    obtaining a sequence of watermarks detected from a presentation of media at a monitored site;
    comparing a data pattern obtained from the sequence of watermarks with a set of possible data patterns to identify a particular transmission of the media, the set of possible data patterns being associated respectively with a set of possible transmissions of the media;
    decoding a respective portion of the data pattern from each watermark of a group of watermarks in the sequence of watermarks; and
    combining the respective portions of the data pattern decoded from each watermark of the group of watermarks to form the data pattern.

2. A method as defined in claim 1, wherein a watermark in the sequence of watermarks is inserted in the media and includes media identifying payload data and a portion of the data pattern.

3. A method as defined in claim 2, wherein the media identifying payload data includes a source identifier and a number within a range of numbers uniquely associated with the media and the source identifier.

4. A method for media monitoring, the method comprising:
    obtaining a sequence of watermarks detected from a presentation of media at a monitored site;
    comparing a data pattern obtained from the sequence of watermarks with a set of possible data patterns to identify a particular transmission of the media, the set of possible data patterns being associated respectively with a set of possible transmissions of the media; and
    increasing a length of the data pattern after an initial comparison of the data pattern with the set of possible data patterns fails to identify the particular transmission of the media.

5. A method for media monitoring, the method comprising:
    obtaining a sequence of watermarks detected from a presentation of media at a monitored site;
    comparing a data pattern obtained from the sequence of watermarks with a set of possible data patterns to identify a particular transmission of the media, the set of possible data patterns being associated respectively with a set of possible transmissions of the media;
    obtaining the set of possible data patterns from a media system monitoring the set of possible transmissions at a location different from the monitored site;
    obtaining respective transmission time information for the set of possible data patterns from the monitoring site; and
    mapping the set of possible data patterns to the respective set of possible transmissions using the respective transmission time information.

6. A method for media monitoring, the method comprising:
    obtaining a sequence of watermarks detected from a presentation of media at a monitored site;
    comparing a data pattern obtained from the sequence of watermarks with a set of possible data patterns to identify a particular transmission of the media, the set of possible data patterns being associated respectively with a set of possible transmissions of the media, wherein the media is first media, the set of possible data patterns is a first set of possible data patterns, and a watermark in the sequence of watermarks includes media identifying data;
    identifying the first media using the media identifying data; and
    selecting the first set of possible data patterns from a plurality of sets of possible data patterns associated respectively with a plurality of different media, the first set of possible data patterns being associated with the first media content.

7. A tangible machine readable storage medium comprising machine readable instructions which, when executed, cause a machine to at least:
    obtain a sequence of watermarks detected from a presentation of media at a monitored site;

compare a data pattern obtained from the sequence of watermarks with a set of possible data patterns to identify a particular transmission of the media, the set of possible data patterns being associated respectively with a set of possible transmissions of the media;

decode a respective portion of the data pattern from each watermark of a group of watermarks in the sequence of watermarks; and combine the respective portions of the data pattern decoded from each watermark of the group of watermarks to form the data pattern.

8. A tangible storage medium as defined in claim 7, wherein a watermark in the sequence of watermarks is inserted in the media and includes media identifying payload data and a portion of the data pattern.

9. A tangible storage medium as defined in claim 8, wherein the media identifying payload data includes a source identifier and a number within a range of numbers uniquely associated with the media and the source identifier.

10. A tangible machine readable storage medium comprising machine readable instructions which, when executed, cause a machine to at least:
obtain a sequence of watermarks detected from a presentation of media at a monitored site;
compare a data pattern obtained from the sequence of watermarks with a set of possible data patterns to identify a particular transmission of the media, the set of possible data patterns being associated respectively with a set of possible transmissions of the media; and
increase a length of the data pattern after an initial comparison of the data pattern with the set of possible data patterns fails to identify the particular transmission of the media.

11. A tangible machine readable storage medium comprising machine readable instructions which, when executed, cause a machine to at least:
obtain a sequence of watermarks detected from a presentation of media at a monitored site; and
compare a data pattern obtained from the sequence of watermarks with a set of possible data patterns to identify a particular transmission of the media, the set of possible data patterns being associated respectively with a set of possible transmissions of the media;
obtain the set of possible data patterns from a media system monitoring the set of possible transmissions at a location different from the monitored site;
obtain respective transmission time information for the set of possible data patterns from the monitoring site; and
map the set of possible data patterns to the respective set of possible transmissions using the respective transmission time information.

12. A tangible machine readable storage medium comprising machine readable instructions which, when executed, cause a machine to at least:
obtain a sequence of watermarks detected from a presentation of media at a monitored site; and
compare a data pattern obtained from the sequence of watermarks with a set of possible data patterns to identify a particular transmission of the media, the set of possible data patterns being associated respectively with a set of possible transmissions of the media, wherein the media is first media, the set of possible data patterns is a first set of possible data patterns, a watermark in the sequence of watermarks includes media identifying data, and the machine readable instructions, when executed, further cause the machine to:

identify the first media using the media identifying data; and
select the first set of possible data patterns from a plurality of sets of possible data patterns associated respectively with a plurality of different media, the first set of possible data patterns being associated with the first media.

13. An apparatus for media monitoring, the apparatus comprising:
an interface to obtain a sequence of watermarks corresponding to a presentation of media at a monitored site;
a media identifier to identify the media based on media identifying information included in at least one watermark in the sequence of watermarks; and
a matcher to:
select a set of possible data patterns associated respectively with a set of possible transmissions identified as being associated with the media;
compare a data pattern obtained from the sequence of watermarks with the set of possible data patterns to identify a particular transmission of the media;
obtain a respective portion of the data pattern from each watermark of a group of watermarks in the sequence of watermarks; and
combine the respective portions of the data pattern obtained from each watermark of the group of watermarks to form the data pattern.

14. An apparatus as defined in claim 13, wherein a watermark in the sequence of watermarks is inserted in the media and includes a portion of the data pattern.

15. An apparatus as defined in claim 13, wherein the media identifying information includes a source identifier and a number within a range of numbers associated with the media and the source identifier.

16. An apparatus for media monitoring, the apparatus comprising:
an interface to obtain a sequence of watermarks corresponding to a presentation of media at a monitored site;
a media identifier to identify the media based on media identifying information included in at least one watermark in the sequence of watermarks; and
a matcher to:
select a set of possible data patterns associated respectively with a set of possible transmissions identified as being associated with the media;
compare a data pattern obtained from the sequence of watermarks with the set of possible data patterns to identify a particular transmission of the media; and
increase a length of the data pattern after an initial comparison of the data pattern with the set of possible data patterns fails to identify the particular transmission of the media.

17. An apparatus for media monitoring, the apparatus comprising:
a first interface to obtain a sequence of watermarks corresponding to a presentation of media at a monitored site;
a media identifier to identify the media based on media identifying information included in at least one watermark in the sequence of watermarks; and
a matcher to:
select a set of possible data patterns associated respectively with a set of possible transmissions identified as being associated with the media; and
compare a data pattern obtained from the sequence of watermarks with the set of possible data patterns to identify a particular transmission of the media;
a second interface to:

obtain the set of possible data patterns from a media system monitoring the set of possible transmissions at a location different from the monitored site;

obtain respective transmission time information for the set of possible data patterns from the monitoring site; and a mapper to map the set of possible data patterns to the respective set of possible transmissions using the respective transmission time information.

* * * * *